United States Patent [19]

Keiser et al.

[11] 4,306,637
[45] Dec. 22, 1981

[54] SHOE BRAKE

[75] Inventors: Emil Keiser, Ebikon; Ljudevit Tomse, Dierikon; Josef Vertesy, Lucerne, all of Switzerland

[73] Assignee: Inventio AG, Hergiswil, Switzerland

[21] Appl. No.: 101,067

[22] Filed: Dec. 7, 1979

[30] Foreign Application Priority Data

Dec. 14, 1978 [CH] Switzerland .................. 12754/78

[51] Int. Cl.$^3$ ............................................ F16D 65/24
[52] U.S. Cl. .................................... 188/170; 188/75; 188/181 T
[58] Field of Search ................... 188/181 T, 170, 75; 187/1 R

[56] References Cited

U.S. PATENT DOCUMENTS

| 1,166,725 | 1/1916 | Trezise | 188/75 |
| 1,210,846 | 1/1917 | Royce | 188/75 |
| 3,348,639 | 10/1967 | Ames et al. | 188/75 |
| 3,465,850 | 9/1969 | Sexton | 188/75 |

FOREIGN PATENT DOCUMENTS 374413 2/1964 Switzerland .................. 188/75

*Primary Examiner*—Joseph E. Valenza
*Attorney, Agent, or Firm*—Werner W. Kleeman

[57] ABSTRACT

A shoe or friction brake having the brake levers thereof connected both at the pivotably mounted end and also at the end driven by a brake spring mutually independently of one another at the brake housing. The pivotably mounted end is connected with the brake housing by elements which have a resilient or spring action perpendicular to the direction of action of the brake spring. These resilient elements are in the form of plate springs and/or a leaf or blade spring. The bearing means for each brake lever is arranged between the plate springs. Each brake lever has operatively associated therewith a choke or reactance coil, and the choke yoke or the like is arranged at the bearing means and the choke core at the brake housing. With the brake levers located in their braking position the latter, when subjected to load, are movable perpendicular to the direction of action of the brake springs, so that the air gaps of the choke coils can be reduced or increased in size, as the case may be. The resultant voltage difference is used to control a drive motor of an elevator such that it produces a torque which relieves the shoe or friction brake.

3 Claims, 4 Drawing Figures

SHOE BRAKE

BACKGROUND OF THE INVENTION

The present invention relates to a new and improved construction of a shoe or friction brake which is of the type comprising two separate brake systems. Each brake system consists of a brake lever, a brake jaw or shoe, a brake spring and a brake venting device. The brake levers are connected independently of one another with a stationary brake housing both at their pivotably mounted end and also at the end driven by the brake spring.

Swiss Patent No. 374,413 discloses a shoe or friction brake which can be particularly used for elevators. With that prior art brake system the shoe brake is vented by load measurement and producing a counter torque or moment of rotation of the drive motor, so that the elevator, after brake venting, can start up without any jerky movements. During the load measurement the shoe or friction brake performs a pivotal movement about the center of the brake disk. For this purpose the brake levers are mounted at a beam carrying at both ends rollers guided in arcuate cams. At the centre of the beam there is arranged an actuation arm acting upon the load measuring device. The free ends of the brake levers are interconnected with one another by means of brake springs and a traction rod. The drawback of this shoe brake resides particularly in the fact that, upon rupture of a brake spring both of the brake shoes or jaws become ineffectual. Other drawbacks of this state-of-the-art system reside in the relatively complicated guiding of the brake lever in the arcuate cams and the therewith associated disadvantage that the load measuring device must be capable of absorbing the entire load which is to be measured, and hence, must be correspondingly constructed.

On the other hand, Swiss Patent No. 530,338 discloses a safety shoe brake for elevators, wherein the two brake levers are connected independently of one another with a stationary brake housing both at the pivotably mounted end and also at the end which is driven by the brake spring. At the driven end this connection is obtained by providing for each brake lever a rod secured at one end at the stationary brake housing, and possessing at the other end a support for the brake spring which acts upon the brake lever. Since with this system design there are provided two independently operating brake levers, with this brake system, upon failure of one of the brake shoes or jaws, for instance due to rupture of a brake spring, the second brake shoe or jaw nonetheless remains operative. This safety shoe brake is not suitable for performing the load measurements needed for the jerk-free start-up at elevators. This is so because due to the stationary arrangement of the brake lever-pivot axis and the rod carrying the brake springs, the brake cannot perform any pivotal movement about the center of the brake disk.

SUMMARY OF THE INVENTION

Therefore, with the foregoing in mind it is a primary object of the present invention to provide a new and improved construction of shoe or friction brake which is not afflicted with the aforementioned limitations and drawbacks of the prior art proposals.

Another and more specific object of the present invention aims at providing a new and improved construction of shoe brake having two mutually independently operating brake levers and which is suitable for carrying out a load measurement.

Yet a further significant object of the present invention aims at a novel construction of friction brake which is relatively simple in design, economical to manufacture, extremely reliable in operation and can be used in conjunction with a load measurement as is needed for the start-up of elevators without any jerky motion.

Now in order to implement these and still further objects of the invention, which will become more readily apparent as the description proceeds the shoe or friction brake of the present development is manifested by the features that the brake levers are connected at least at one end by means of elements, with the stationary brake housing, these elements being resilient or springy in a direction perpendicular to the line or direction of action of the brake springs. A load measuring device is provided for converting the stroke or displacement movements of the resilient elements into electrical signals.

According to a preferred embodiment of the invention the load measuring device consists of two choke or reactance coils. Each brake lever has operatively associated therewith one of the choke coils and the choke yoke is attached to the bearing means of the brake lever and the choke core is adjustably arranged at the brake housing.

The advantages which can be realized when practising the present invention particularly reside in the fact that upon rupture of a brake spring the second brake shoe or jaw still remains operative, so that with appropriate contact force the load is retained. A further benefit of the ivention is in the resilient mounting arrangement of the brake lever which takes up the load, so that there is relieved the actual load measuring device, which, in turn, can be designed to be small and favorable in terms of cost factors. Moreover, it is advantageous if a load measuring choke is operatively associated with each brake lever. In this way there is realized the possibility, by evaluating the electrical signals produced during the load measurement, to determine whether or not one of the brake shoes has become ineffectual.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENTS

Figure 1:
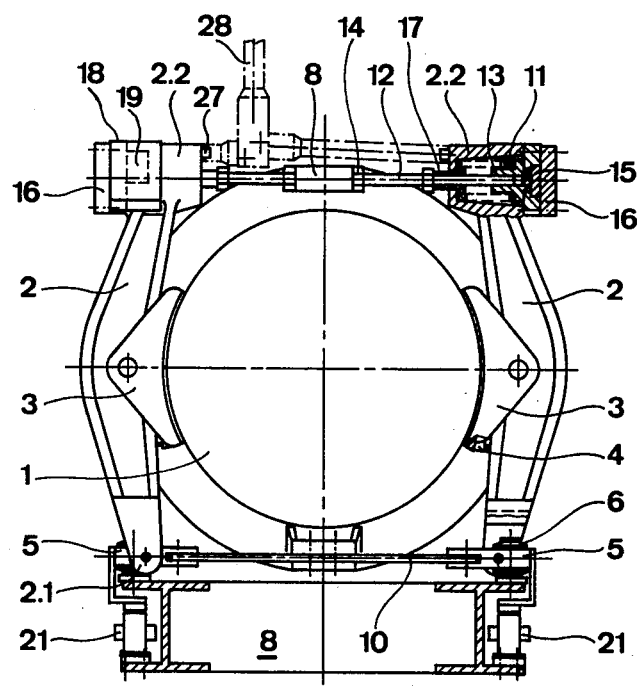
FIG. 1 is an elevational view of a shoe or friction brake according to the invention.

Describing now the drawings, it is to be understood that since the invention is concerned with the construction of a novel shoe or friction brake there has been omitted from the illustration details of the elevator system and drive with which the shoe brake can be advantageously employed, in order to simplify the illustration. In FIG. 1, reference character 1 designates a brake disk which is rigidly connected with the conventional drive of an elevator. The brake apparatus contains two brake levers 2 at which there are movably arranged the brake shoes or jaws 3. A suitable rubber buffer or cushion 4 supports the related brake shoe or jaw 3 when the shoe brake is vented, so that a uniform or equal size air gap is present between each brake shoe 3 and the brake disk 1. The brake levers 2 are each pivotably mounted at a related bearing or support means 5. Each bearing means 5 is connected by means of resilient elements, here shown in the form of plate springs 6 and a bolt 7 with a brake housing 8, as best recognized by referring to FIGS. 1 and 3.

Figure 3:
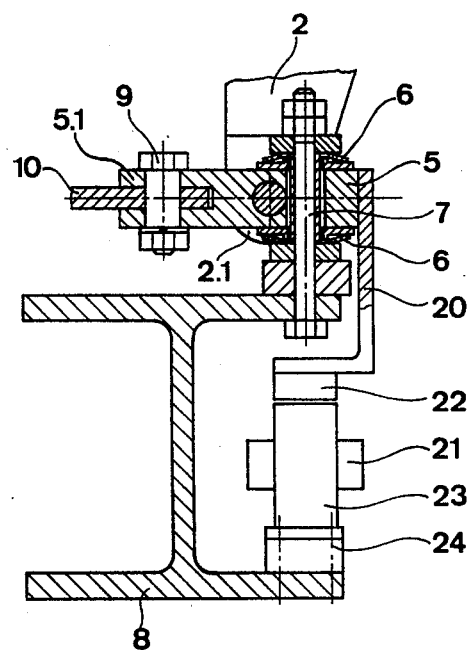
FIG. 3 is a cross-sectional view through the bearing or mounting means of a brake jaw on an enlarged scale in relation to the showing of FIGS. 1 and 2.

The bearing means 5 possesses a forked or bifurcated end 5.1, by means of which it is connected, as shown in FIGS. 1 and 3, with a leaf or blade spring 10 attached at the brake housing 8 through the intermediary of a pivot bolt 9. Prior to tightening the pivot bolt 9 the brake lever 2, in order to adjust the related brake shoe or jaw 3 at the brake disk 1, can be pivoted through a path determined by the play between the bolt 7 and bearing means 5.

The end 2.2 of the brake lever 2, which is situated opposite the pivotably mounted end 2.1, is connected by a brake spring 11, producing the requisite braking force or pressure, and a tension or traction rod 12 with the brake housing 8. The brake spring 11 bears at one end at the brake lever 2 and at the other end at a pressure nut 13 or equivalent structure which is threadably connected with the traction rod 12. By means of a nut member 14 it is possible to secure the traction rod 12 which has been threaded into the brake housing 8. The pressure or compression nut 13 is provided at the side thereof facing away from the traction rod 12 with a semi-spherical end surface 13.1. Bearing against this semi-spherical end surface 13.1 is a piston 15 of a fluid-actuated, here a hydraulic cylinder 16 which is fixedly connected with the brake lever 2 and serves as a brake venting device. Upon infeed of a pressurized fluid medium through any suitable and therefore not particularly illustrated pressure hose the vent stroke of the shoe brake is limited by the shoulder 17.1 of a threaded sleeve 17 which is threadably connected with the traction rod 12, as best seen by referring to FIGS. 1 and 4.

Figure 2:
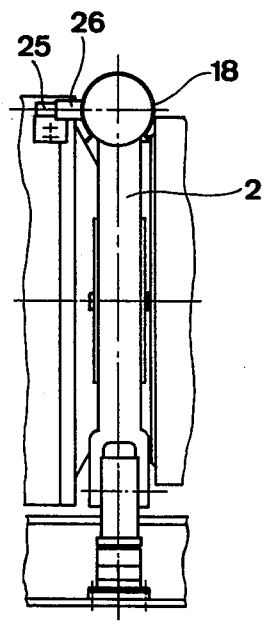
FIG. 2 is a fragmentary side view of the shoe brake of FIG. 1.
Figure 4:
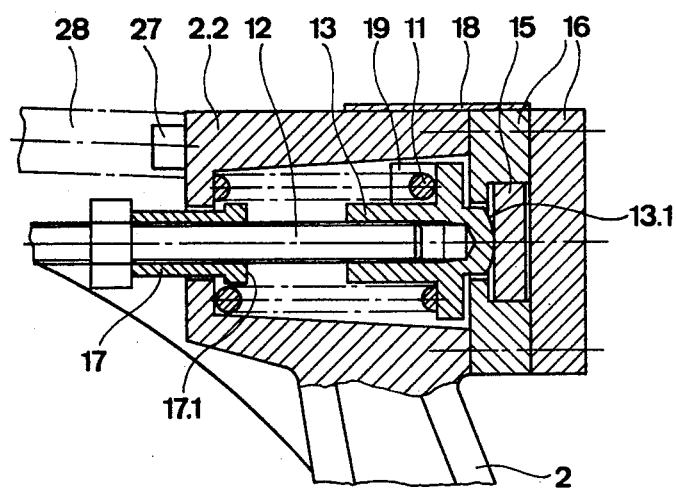
FIG. 4 is a fragmentary sectional view through the end of the brake lever driven by the related brake spring and on an enlarged scale in relation to the showing of FIGS. 1-3.

Reverting to FIGS. 1, 2 and 4 there will be recognized a cover member 18 which covers an opening 19 in the brake lever 2, this opening 19 rendering possible adjustment of the pressure nut member 13 when the brake lining has worn. At the bearing means 5 there is attached by means of a support 20 the yoke 22 or equivalent structure of a choke coil 21 serving as a load measuring device. The core 23 of the choke coil 21 is adjustably arranged in the brake housing 8 by means of the screws or threaded bolts 24 or equivalent structure (FIGS. 1 and 3). A microswitch 25 secured to the brake housing 8, upon venting of the shoe brake, is activated, as best seen by referring to FIG. 2, by an actuation arm 26 arranged at the brake lever 2. Reference character 27 designates pins provided at the brake levers 2, serving for receiving a manual brake or venting lever 28 or the like (FIGS. 1 and 4).

Having now had the benefit of the discussion of the shoe brake employing two separate brake systems as described above, its mode of operation will now be considered and is as follows: if no torque or rotational moment is applied to the brake disk 1, then both of the air gaps between the yoke 22 and core 23 of the related choke coil 21 are of the same size. As soon as a torque is present with the brake levers 2 located in their braking position, then the brake levers 2 move opposite to one another approximately in their lengthwise direction. Hence, one of the air gaps is increased in size and the other air gap is reduced in size. By means of the thus generated potential or voltage difference of both choke coils 21 there is controlled in a manner known to the art, for instance as disclosed in the aforementioned Swiss Patent No. 374,413, the elevator drive motor in such a way that it produces a counter torque which relieves the beam brake and electrically retains at standstill the elevator, so that upon arrival of a travel command the elevator can start-up free of any jerky movement.

Upon venting the jaw brake a conventional hydraulic unit produces a constant oil pressure, under the action of which the piston 15 is pressed against the pressure nut member 13. Now the hydraulic cylinder 16 together with the related brake lever 2 of the brake jaw 3 are lifted, against the force of the brake spring 11, from the brake disk 1. At the moment of lift-off of the brake shoe 3 the microswitch 25 is actuated, so that the load measuring operation is completed and the elevator system is freed for travel of the elevator.

As the resilient element there also can be used the traction rods 12 formed as circular rod springs, wherein the brake lever 2 is guided at its driven end free of play to be displaceable upon the traction rod 12 and at its pivotably mounted end is arranged to be displaceable perpendicular to the line of action of the brake spring 11 at the brake housing 8. It is also possible to connect the brake lever 2 at both ends by means of resilient elements, for instance circular rod springs, with the brake housing 8.

While there are shown and described present preferred embodiments of the invention, it is to be distinctly understood that the invention is not limited thereto, but may be otherwise variously embodied and practised within the scope of the following claims. ACCORDINGLY,

What we claim is:

1. A shoe brake arrangement for a brake containing a brake disk comprising:
   two separate brake systems;
   each of said brake systems comprising:
   a brake lever;
   a brake shoe;
   a brake spring; and
   a brake vent device;
   a stationary brake housing;
   said brake spring driving one end of the related brake lever;
   means for pivotably mounting the other end of each said brake levers at the stationary brake housing;
   said mounting means comprising bearing means and resilient elements for mounting each of the brake lvers at least at said other end of said brake lever;
   said resilient elements comprising a common leaf spring fixedly connected with the brake housing and connected to said bearing means by pivot bolt means;
   said resilient elements further comprising plate springs which resiliently support said bearing means;

said brake levers, when the brake is activated and in the presence of a torque applied to the brake disk of the brake, being displaceable essentially perpendicular to the line of action of the brake springs and against the spring force of the resilient elements; and a load measuring device for converting into electrical signals the resilient movement of the related resilient elements.

2. The shoe brake arrangement as defined in claim 1, wherein:

said load measuring device comprises two choke coils;

each brake lever having operatively associated therewith one of the choke coils;

each choke coil having a choke yoke attached to the bearing means of the related brake lever; and each choke coil having a choke core which is adjustably arranged at the brake housing.

3. The shoe brake arrangement as defined in claim 1, further including:

a respective pressure nut member provided for each brake spring;

each brake spring bearing at one end at the related brake lever and at the other end at the related pressure nut member;

a respective traction rod provided for each brake system and fixedly connected with the brake housing;

the pressure nut member being adjustably arranged at the related traction rod;

said pressure nut member being provided at a side thereof facing away from the traction rod with a substantially semispherical end face;

a respective hydraulic piston-and-cylinder means serving as a brake venting device provided for each brake system;

said hydraulic piston-and-cylinder means being fixedly connected with the related brake lever; and the pressure nut member bearing against the piston of the related brake lever.

* * * * *